(12) United States Patent  
Dellow et al.

(10) Patent No.: US 8,191,125 B2  
(45) Date of Patent: May 29, 2012

(54) SYSTEM, APPARATUS AND METHOD FOR RESTRICTING DATA ACCESS

(75) Inventors: Andrew Dellow, Gloucester (GB); Rodrigo Cordero, Bristol (GB)

(73) Assignee: STMicroelectronics Limited, Bristol (GB)

( * ) Notice: Subject to any disclaimer, the term of this patent is extended or adjusted under 35 U.S.C. 154(b) by 2293 days.

(21) Appl. No.: 11/016,537

(22) Filed: Dec. 17, 2004

(65) Prior Publication Data

US 2005/0235308 A1    Oct. 20, 2005

(30) Foreign Application Priority Data

Dec. 19, 2003    (EP) ..................................... 03258058

(51) Int. Cl.  
*G06F 21/00*    (2006.01)

(52) U.S. Cl. .......................................................... 726/7

(58) Field of Classification Search ........................ 726/7  
See application file for complete search history.

(56) References Cited

U.S. PATENT DOCUMENTS

| | | | | |
|---|---|---|---|---|
| 5,870,267 A * | 2/1999 | Kitano | ............................ | 361/103 |
| 6,320,846 B1 * | 11/2001 | Jamp et al. | ..................... | 370/235 |
| 6,530,021 B1 * | 3/2003 | Epstein et al. | ................ | 713/176 |
| 6,553,496 B1 | 4/2003 | Buer | ............................ | 713/200 |
| 6,637,027 B1 | 10/2003 | Breslauer et al. | ................ | 725/25 |
| 6,904,039 B1 * | 6/2005 | Hung et al. | ..................... | 370/390 |
| 2001/0028631 A1 * | 10/2001 | Iwamura et al. | ............... | 370/230 |
| 2003/0105976 A1 * | 6/2003 | Copeland, III | ................ | 713/201 |
| 2003/0174839 A1 * | 9/2003 | Yamagata et al. | ............. | 380/270 |
| 2003/0188318 A1 * | 10/2003 | Liew et al. | ........................ | 725/93 |
| 2004/0003262 A1 * | 1/2004 | England et al. | ................ | 713/189 |
| 2004/0049645 A1 * | 3/2004 | Lee et al. | ......................... | 711/163 |
| 2004/0098591 A1 * | 5/2004 | Fahrny | ............................ | 713/176 |
| 2004/0107443 A1 * | 6/2004 | Clancy | ............................ | 725/100 |
| 2004/0177261 A1 * | 9/2004 | Watt et al. | ....................... | 713/193 |
| 2006/0059506 A1 * | 3/2006 | Isenser Farre et al. | .......... | 725/25 |

FOREIGN PATENT DOCUMENTS

| | | |
|---|---|---|
| EP | 1 043 729 A2 | 10/2000 |
| EP | 1 370 084 A1 | 12/2003 |
| WO | WO 98/47060 | 10/1998 |

* cited by examiner

*Primary Examiner* — Michael S McNally  
(74) *Attorney, Agent, or Firm* — Seed IP Law Group PLLC (57) ABSTRACT

An embodiment comprises a semiconductor integrated circuit for restricting the rate at which data may be accessed from an external memory by a device coupled to the circuit. The rate of data access is restricted if the data access satisfies one or more conditions. For example, one of the conditions is that the device which is requesting the data is insecure. Another condition is that the requested data is privileged. A data access monitor is provided to monitor data accesses and to is arranged to generate an access signal to indicate whether the conditions are satisfied or not. A bandwidth comparator determines whether data access exceeds a threshold and, if so, the semiconductor integrated circuit is impaired to prevent further data access.

37 Claims, 6 Drawing Sheets

SYSTEM, APPARATUS AND METHOD FOR RESTRICTING DATA ACCESS

BACKGROUND OF THE INVENTION

1. Field of the Invention

This disclosure relates to system, apparatus and method for restricting access to data.

2. Description of the Related Art

In secure systems such as conditional access television (CATV), access to some data needs to be restricted. For example, a set top box for use in CATV may store broadcast television data that should only be accessed by an authorised user who has made the appropriate payment to the broadcast service provider. Access of data by unauthorized persons such as hackers compromises the security of the system and should be prevented.

Unauthorized access to services such as CATV broadcasts is often prevented by encrypting any data to which access should be restricted. With systems utilising encryption schemes, a hacker may be able to access data from within the system, but is prevented from using the information contained in the data by virtue of the encryption. However, encryption schemes rely on the confidentiality of secret keys that are used to decrypt the data. If the identity of the relevant secret key becomes known, then the system is breached. Hackers may also devise other ways to circumvent the security of the system.

We have appreciated the need for a system in which unauthorized data access can be identified so that access to confidential data can be restricted, whether encrypted or unencrypted.

BRIEF SUMMARY OF THE INVENTION

The invention is defined in the independent claims to which reference is now directed. Advantageous features are set out in the dependant claims.

An embodiment of the invention comprises a semiconductor integrated circuit for restricting the rate at which data may be accessed from an external memory by a device on the circuit. The rate of data access is restricted if the data access satisfies one or more conditions. For example, one of the conditions is that the device which is requesting the data is insecure. Another condition is that the requested data is privileged. A data access monitor is provided to monitor data accesses and to is arranged to generate an access signal to indicate whether the conditions are satisfied or not. The access signal comprises a stream of data portion signals, each one corresponding to a portion of data of a predetermined size being retrieved from the external memory that satisfies the conditions. A bandwidth comparator receives the data portion signals and determines the rate of data retrieval satisfying the conditions. Each data portion signal causes a counter in the bandwidth comparator to be incremented, while clock signals cause the counter to be decremented at a constant rate. The counter value is compared with one or more thresholds, and if the counter value exceeds one or more of the thresholds, the functioning of the semiconductor integrated circuit is impaired to prevent further data access.

In one aspect, a semiconductor integrated circuit for restricting a rate of data access from an external memory requested by one of one or more devices coupled to the semiconductor integrated circuit comprises: a data access monitor arranged to determine whether a data access from the external memory satisfies one or more predetermined conditions, and to generate an access signal according to whether the conditions are satisfied; and a bandwidth comparator arranged to receive the access signal, and, if the access signal indicates that the data access satisfies the conditions, to determine a rate of data retrieval that satisfies the conditions, compare the rate of data retrieval with one or more thresholds, and to generate a threshold signal according to whether one or more of the thresholds have been exceeded to impair functioning of the semiconductor integrated circuit.

In another aspect, a conditional access device for pay television comprises a semiconductor integrated circuit for restricting a rate of data access from an external memory requested by one of one or more devices coupled to the semiconductor integrated circuit, the semiconductor integrated circuit comprising: a data access monitor arranged to determine whether a data access from the external memory satisfies one or more conditions, and to generate an access signal according to whether the conditions are satisfied; and a bandwidth comparator arranged to receive the access signal, and, if the access signal indicates that the data access satisfies the conditions, to determine a rate of data retrieval that satisfies the conditions, compare the rate of data retrieval with one or more thresholds, and to generate a threshold signal according to whether one or more of the thresholds have been exceeded to impair functioning of the semiconductor integrated circuit.

In another aspect, a method for restricting the rate of data access requested by one of one or more devices from an external memory comprises: monitoring data accesses from the external memory; determining whether a monitored data access satisfies one or more conditions; generating an access signal according to whether the conditions are satisfied; determining a rate of data access satisfying the conditions; comparing the rate of data access with one or more thresholds; generating a threshold signal according to whether one or more of the threshold have been exceeded; and impairing the functioning of the data access if one or more of the thresholds are exceeded.

In another aspect, a system for controlling access to a memory comprises: means for determining whether a received data request is from a secure device; means for determining whether a rate of data exceeds a first threshold; and means for restricting access to the memory communicatively coupled to the means for determining whether a received data request is from a secure device and the means for determining whether a rate of data exceeds a first threshold.

In another aspect, a method of controlling access to a memory comprises: receiving a request to access data in the memory; determining whether the request is from an authorized device; processing a request from an authorized device; monitoring a data rate associated with the processing; and controlling the access in response to the monitoring.

In another aspect, a computer readable media contains instructions for causing a memory controller to: determine whether a received request to access a memory is from an authorized device; process a request from an authorized device; monitor a data rate associated with the processing; and control access to the memory in response to the monitoring.

DETAILED DESCRIPTION OF THE INVENTION

Figure 1:
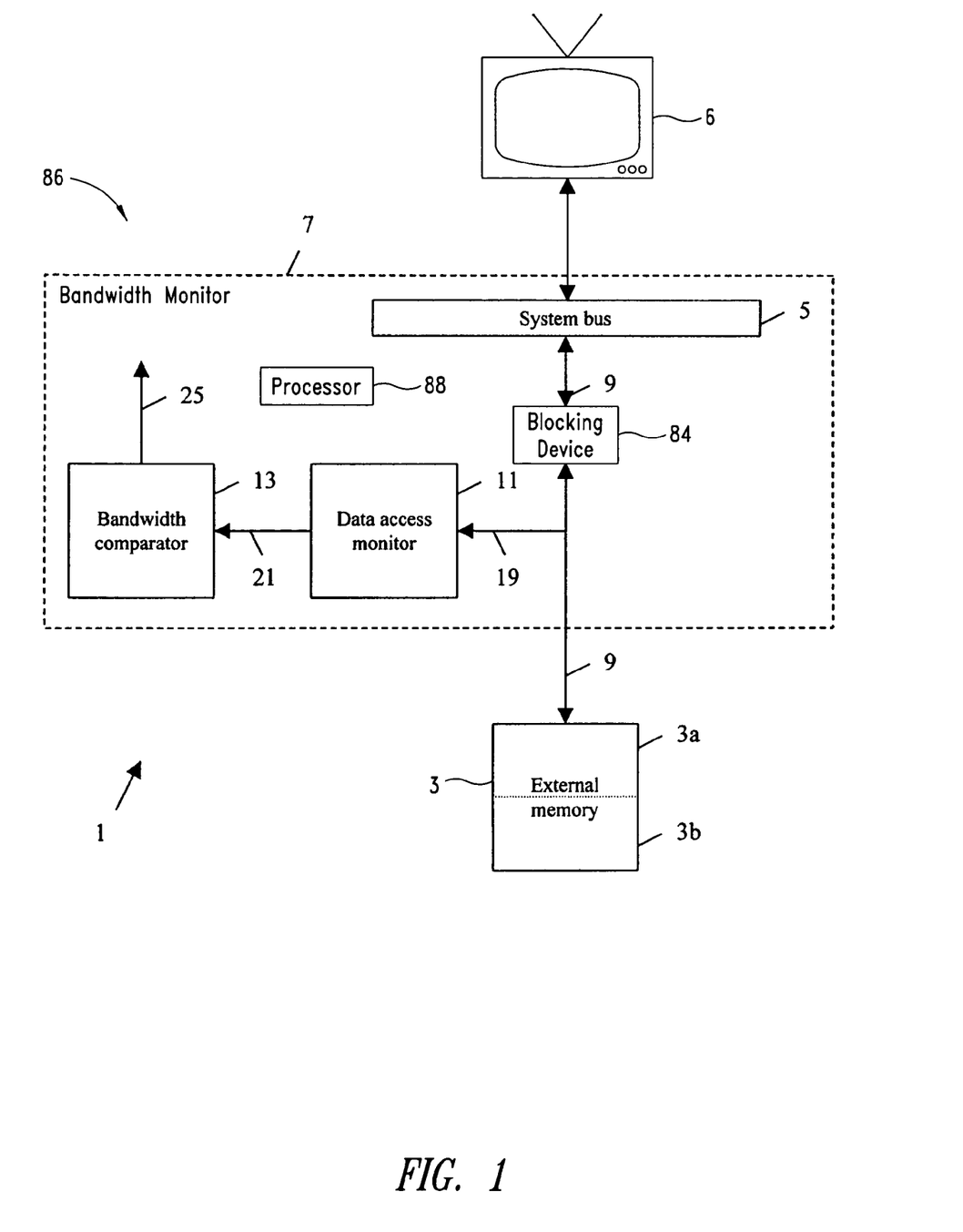
FIG. 1 is a schematic diagram of a system embodying the invention.

FIG. 1 is a schematic diagram of a system 1 embodying the invention. The system may be for example a set-top box for use in conditional access television. The system 1 comprises an external memory 3, a system bus 5, and a bandwidth monitor 7.

The external memory 3 stores data for use within the system 1. The system bus 5 provides an interface between the external memory 3 and other parts of the system 1 including one or more devices 6 so that data may be retrieved from the external memory 3 and transmitted to a requesting device. For example, in the case that the system forms part of a set-top box, the device 6 may be a television set or video recorder that may request access to broadcast data stored in the external memory 3 via communication link 9. When the data bus 5 receives a data access request from a device 6, the request is transmitted to the external memory 3. The data access request includes an indication of the location of the data being requested and an identification of the device 6 from which the request originated. If data blocks of variable size are to be retrieved, the location of the data may be defined by the start and end memory addresses of the data block, or by the start memory address and the size of the data block. If individual blocks of data of a definite predetermined size (such as a byte) are to be retrieved, then the location of data may be defined by a single start memory address (the size of the data block being known). The device identification may be in the form of an arbitrary code or a device port number. The specified data is retrieved from the external memory 3 and transmitted via communication link 9 to the data bus 5. The data bus 5 then transmits the retrieved data to the requesting device 6, which may be located using the device identification.

In secure systems, it is often required that access to data is restricted according to certain conditions. For example, according to one condition, access to data may be restricted if the data itself is privileged. The term privileged is used herein to describe data that is confidential and which requires protection from unauthorized access. The term privilege status may be used to indicate whether or not data is privileged. According to a second condition, data access may be restricted if the device (see, e.g., device 6 in FIG. 1) requesting the data is insecure and vulnerable to hacking. A combination of conditions may be used, so that data access may be restricted for example when an insecure device attempts to access privileged data. Secure devices may be allowed access to privileged data. However, devices which are insecure such as processors should be prevented from accessing large volumes of privileged data. References to conditions may include any aspect of a data access which by virtue of that aspect would require the access to be restricted.

In cases where data access does need to be restricted, it may be desirable that the rate at which the data is accessed is restricted. For example, in an embodiment where the system is a pay-television system, the data access bandwidth may be restricted to a value below 200 kbits/sec. This value is chosen to be 10% of a standard video bit stream of 2 Mbits/sec. By restricting the bandwidth in this way, data may be retrieved at a rate which is sufficient for legitimate use of the system. However, unauthorized access to a video stream is impaired since during a significant period of time, on average, only 10% of data from the video stream may be retrieved, and the resulting video would be of insufficient quality to be watchable.

Some embodiments of the invention advantageously allow the rate of access of data to be monitored so that unauthorized data access can be detected and prevented. This may be accomplished by the provision of a bandwidth monitor, an embodiment of which is described below. Compliance or non-compliance with specified conditions determines whether or not data access is monitored. In one embodiment, the specified conditions are the first and second conditions mentioned above.

The external memory 3 is separated into two portions. A first portion 3a stores data that is privileged and which needs to be protected from unauthorized access. Examples of data stored within the first portion 3a include broadcast data relating to services for which a user subscription is required. A second portion 3b stores data that is unprivileged, access to which does not need to be restricted. Examples of data stored within the second portion 3b include personal settings, or data relating to free broadcast services. Data may be stored in the first portion 3a in an encrypted form, while data stored in the second portion 3b may be stored unencrypted.

The first and second portions of the external memory 3 may occupy particular definite regions of memory. In one embodiment, the first and second portions of the external memory 3 each consist of a contiguous block of memory. In this embodiment, data stored in the first portion 3a has a memory address within a first range of values, and data stored in the second portion 3b has a memory address within a second range of values. With this arrangement, the privilege status of data retrieved from the external memory 3 may be determined from the memory address of that data. In particular, the memory address of retrieved data may be compared to the first and second ranges of values. If the memory address falls within the first range of values then the data is privileged, and if the memory address falls within the second range of values, then the data is unprivileged.

In other embodiments, the external memory 3 may be formed from more than two portions, where each portion stores either privileged data or unprivileged data. In a further alterative embodiment, privileged and unprivileged data may not be separated into distinct regions of memory. Instead, the privilege status of data may be identified by means of a privilege tag, for example a 1 bit tag, associated with each unit of data.

Figure 2:
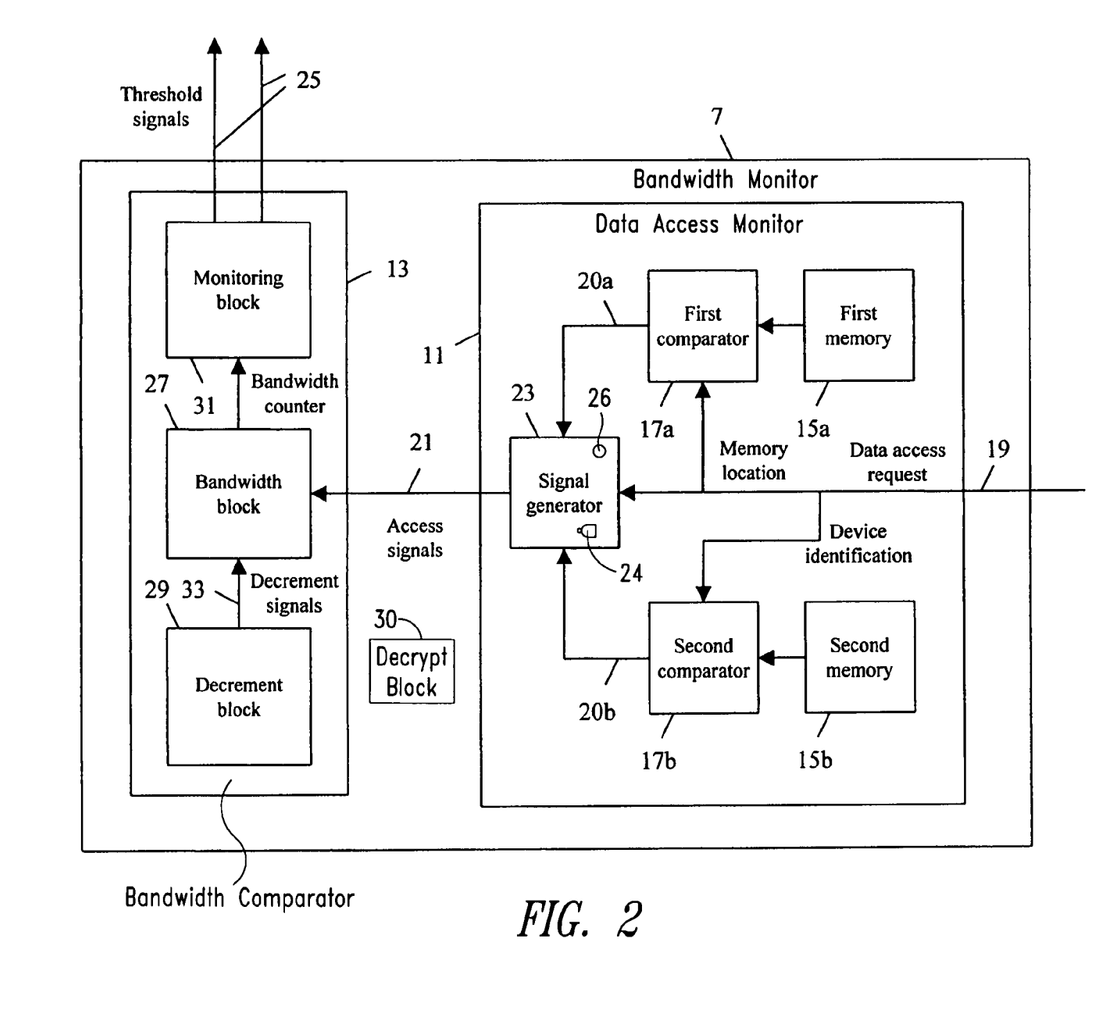
FIG. 2 is a schematic diagram of an embodiment of the bandwidth monitor shown in FIG. 1.

FIG. 2 is a schematic diagram of the bandwidth monitor 7, which comprises a data access monitor 11, a bandwidth comparator 13 and a decryption block 30. The data access monitor 11 is arranged to monitor data accesses from the external memory 3, to determine that the data access satisfies one or more conditions, and to generate an access signal 21 to indicate when the data access satisfies those conditions. In one embodiment, two conditions are specified, firstly that the data being accessed is privileged, and secondly that the device requesting the data is an insecure device. The nature and purpose of the signal 21 is described in greater detail below.

The data access monitor 11 comprise first and second memories 15a, 15b and first and second comparators 17a, 17b which are connected in such a way that the first and second comparators 17a, 17b may access information stored respectively in the first and second memories 15a, 15b. The data access monitor 11 also comprises a signal generator 23, connected to the comparators 17a, 17b, for generating an access signal 21 to indicate that data access from the external memory 3 satisfy the specified conditions.

The first memory 15a is arranged to store an indication of which regions of the external memory 3 contain privileged data. For example, the first memory 15a may store the start and end memory addresses of the first and second portions of the external memory 3 in a table. The second memory 15b is arranged to store a list of identifications of the devices (see, e.g., device 6 in FIG. 1) that are able to access the external memory 3, and arranged to store an indication for each device whether it is secure or insecure.

When data is retrieved from the external memory 3, the data access request is transmitted to the data access monitor 11 via communication link 19 which is connected to communication link 9. The first comparator 17a receives the portion of the data access request relating to the location from which the data is being retrieved at a first input, and receives information from the first memory 15a at a second input. The first comparator 17a compares the location from which the data was retrieved with those locations of the external memory 3 which store privileged data. Using the method described above, the first comparator then determines the privilege status of the retrieved data, and outputs a signal to indicate that privilege status. The signal may comprise for example a single bit which takes the value 1 if the data is privileged, and takes the value 0 if the data is unprivileged. The signal generated by the first comparator 17a is transmitted via a communication link 20a to a first input of the signal generator 23. This signal is indicative of whether the condition that the data being accesses is privileged is satisfied.

If the data being retrieved is determined to be privileged, and therefore stored in the external memory 3 in an encrypted form, the data may be decrypted by a decryption block 30 in the bandwidth monitor 7 before being transmitted to the data bus. In this case, the decryption block 30 receives the signal generated by the first comparator 17a, receives the retrieved data, and selectively decrypts the data if the signal indicates that the data is privileged. The decrypted data is then transmitted from the decryption block 30 to the data bus 5. Alternatively, data retrieved in an encrypted form may be directly transmitted to the data bus 5 where it is further transmitted to a cryptographic circuit in another part of the system 1 to be decrypted there.

The second comparator 17b receives the portion of the data access request relating to the identification of the device which has requested the data at a first input, and receives information accessed from the second memory 15b at a second input. The second comparator 17b compares the device identification with the list of identifications stored in the second memory to determine whether the device is secure or insecure. The second comparator then outputs a signal to indicate that the device is either secure or insecure. The signal may comprise for example a single bit which takes the value 1 if the device is insecure, and takes the value 0 if the device is secure. The signal generated by the second comparator 17b is transmitted via a communication link 20b to a second input of the signal generator 23. This signal is indicative of whether the condition that the device requesting the data is insecure is satisfied.

The signal generator 23 comprises a control 24 arranged to receive the signals generated by the first and second comparators 17a, 17b, and to generate a signal to indicate whether all of the specified conditions are satisfied. For example, in one embodiment, the control 24 comprises an AND gate which receives each of the comparator signals at first and second inputs respectively, and generates an output signal having a value 1 only if both of the inputs has a value of 1. The signal generated by the control 24 is indicative of whether all of the specified conditions are satisfied. Unless explicitly stated otherwise, references to data access below refer to data access for which all the specified conditions are satisfied, and references to retrieved data and data portions may be construed accordingly.

The signal generator 23 further comprises a counter 26 which is initially set to zero and which may be incremented by a selected amount. When the counter value reaches a predetermined maximum, the value is reset to zero so that the counter 26 increments cyclically between zero and the maximum value. When the signal generator 23 receives a signal from the control 24 indicating that both a portion of privileged data is currently being retrieved and that an insecure device is requesting the data, the signal generator 23 calculates the volume of the data portion in a particular unit of measurement. The data portion may be a single byte or a larger block of data, and the unit of measurement of data volume may be a single byte or larger unit. The signal generator 23 receives the portion of the data access request relating to the location of the retrieved data, and calculates the volume of the data portion, for example by calculating the difference between the end memory address and the start memory address of the data portion. The value of the counter 26 is then incremented by an amount equal to the calculated volume of the data portion. The signal generator 23 is arranged to generate a data portion signal whenever the counter 26 reaches the maximum value. The data portion signal may comprise, for example, a single bit binary pulse having the value 1.

A distinct data portion signal is generated by the data access monitor 11 whenever the total volume of data retrieved equals an integer multiple of a predetermined sub-volume of data. The sub-volume corresponds to an integer number of units of data, the number being equal to the counter maximum value. A data portion signal is thus generated when a sub-volume of data has been retrieved initially, and further signals 21 are generated for each subsequent sub-volume of data retrieved. If, for example, the unit of measurement of data volume is a word (2 bytes), and the counter maximum value is equal to 512, then a sub-volume corresponds to 1 kilobyte, and a distinct data portion signal is generated for every kilobyte of data that is retrieved. In one embodiment, a signal may be generated for each unit of data that is retrieved from the external memory 3 and the counter 26 may be eliminated.

As data is retrieved from the external memory 3, a series of data portion signals are generated. The number of data portion signals indicates the total volume of data being retrieved, and the frequency of the data portion signals indicates the rate at which data is being retrieved. The bit flow comprising the series of data portion signals forms the data access signal 21. The presence of data portion signals in the data access signal 21 provides an indication that the rate of data access should be monitored.

The bandwidth comparator 13 is arranged to receive the access signal 21 generated by the data access monitor 11, and to generate a threshold signal 25 if the time averaged rate of data access exceeds a predetermined threshold. The bandwidth comparator 13 comprises a bandwidth block 27, a decrement block 29 and a monitoring block 31.

The bandwidth block 27 comprises a bandwidth counter 61 (see FIG. 4), initially set to zero, which increments in value by one when a signal is received at a first input, and which decrements by one when a signal is received at a second input. The decrement block 29 is arranged to periodically output a decrement signal 33 at predetermined time intervals. The data portion signals comprised in the access signal 21 generated by the data access monitor 11 are received at the first input of the bandwidth block 27, and the signals 33 generated by the decrement block 29 are received at the second input of the bandwidth block 27. The bandwidth counter is incremented when data is retrieved from the external memory 3, and is decremented at a constant rate by the decrement block 29. The bandwidth counter 61 is arranged so that the counter value never falls below zero. If the counter has a value of zero and a decrement signal 33 from the decrement block 29 is received at the second input of the bandwidth block 27, the counter maintains a zero value.

Figure 3:
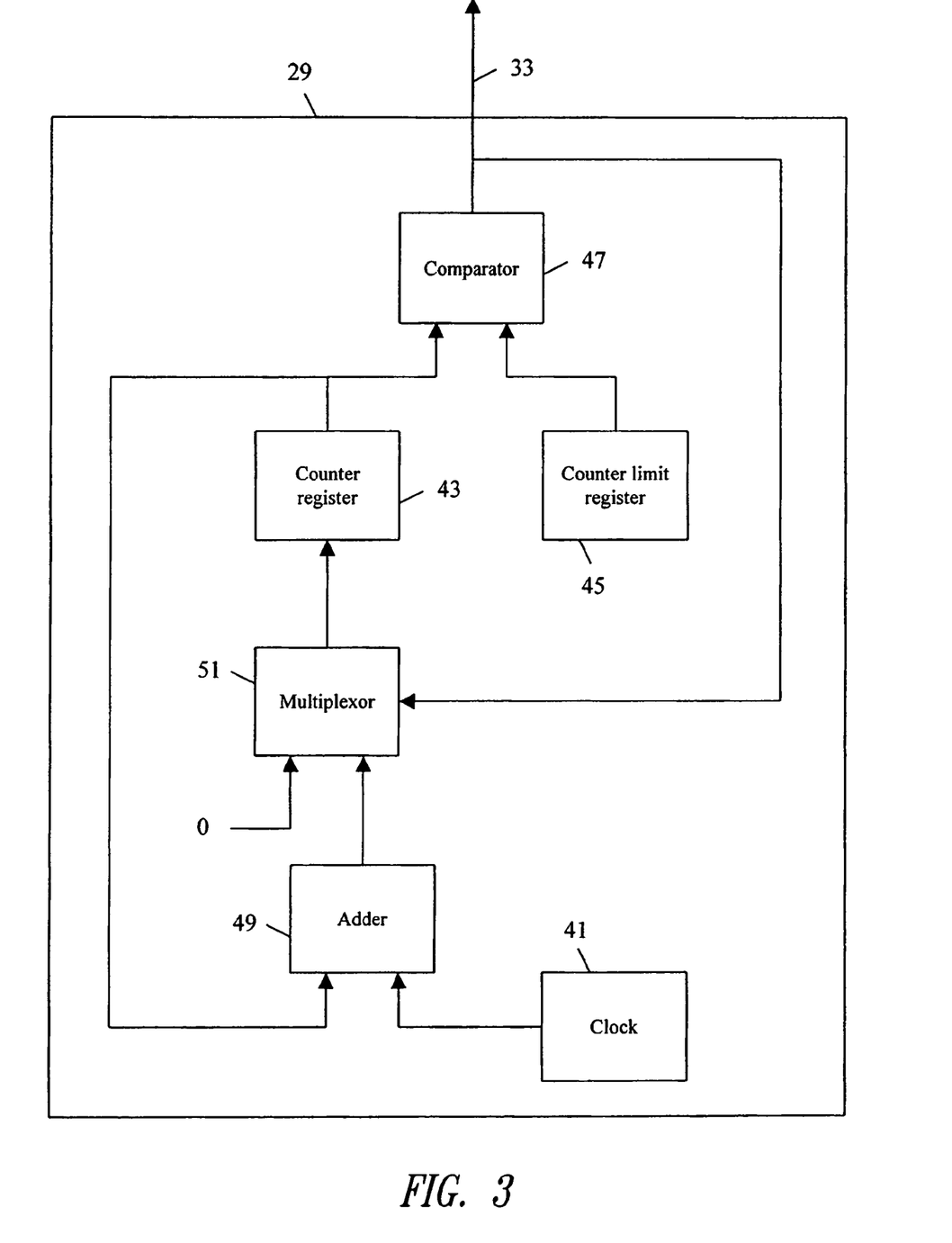
FIG. 3 is a schematic diagram of an embodiment of the decrement block shown in FIG. 2.

FIG. 3 shows a schematic diagram of an embodiment of the decrement block 29. The decrement block 29 comprises a timer or clock 41, a counter register 43, a counter limit register 45, a comparator 47, an adder 49, and a multiplexor (MUX) 51. The value stored in the counter register 43 is initially set to zero, and may be subsequently modified by the output of the MUX 51. The value stored in the counter limit register 45 is constant.

The clock 41 is arranged to output a signal representing the value 1 at predetermined fixed time intervals, which signal forms a first input of the adder 49. The current value of the counter register 43 forms a second input of the adder 49. The adder 49 is arranged to increment the value received at the second input by an amount equal to the value of the first input. The resulting output of the adder 49, being the current value of the counter register 43 incremented by one, forms a first input of the MUX 51. A second input of the MUX 51 comprises a signal representing the value 0. One of the inputs of the MUX 51 is selected and is output from the MUX 51 into the counter register 43. In this way, whenever the clock outputs a signal, the value of the counter register 43 may either be incremented in value or set to zero depending on the selected output. Which input of the MUX 51 is selected as the output depends on the result of a comparison between the current value of the counter register 43 and the counter limit register 45.

The current value of the counter register 43 forms a first input of the comparator 47, and the value of the counter limit register 45 forms a second input of the comparator 47. The comparator 47 is arranged to compare the two inputs and to generate a signal according to whether the values of the two inputs are equal. If the two input values are equal then the output represents a value of 1, otherwise a value of 0 is output. The output of the comparator 47 is input into the MUX 51 to select which input of the MUX 51 is output into the counter register 43. If a value of 1 is output from the comparator 47, then the output of the MUX 51 is selected to be the zero value, otherwise the output of the MUX 51 is selected to be the incremented value of the counter register 43. The output of the comparator 47 is a decrement signal which is transmitted to the bandwidth block 27.

This arrangement is a cyclic counter with a maximum value defined by the contents of the counter limit register 45. With this arrangement, a decrement signal is output from the decrement block 29 at periodic intervals, the interval being an integer multiple of the period between successive clock signals. The particular multiple is set by the contents of the counter limit register 45. With a constant clock rate, the decrement block 29 may be arranged to output decrement signals at a lower frequency than the clock rate.

Figure 4:
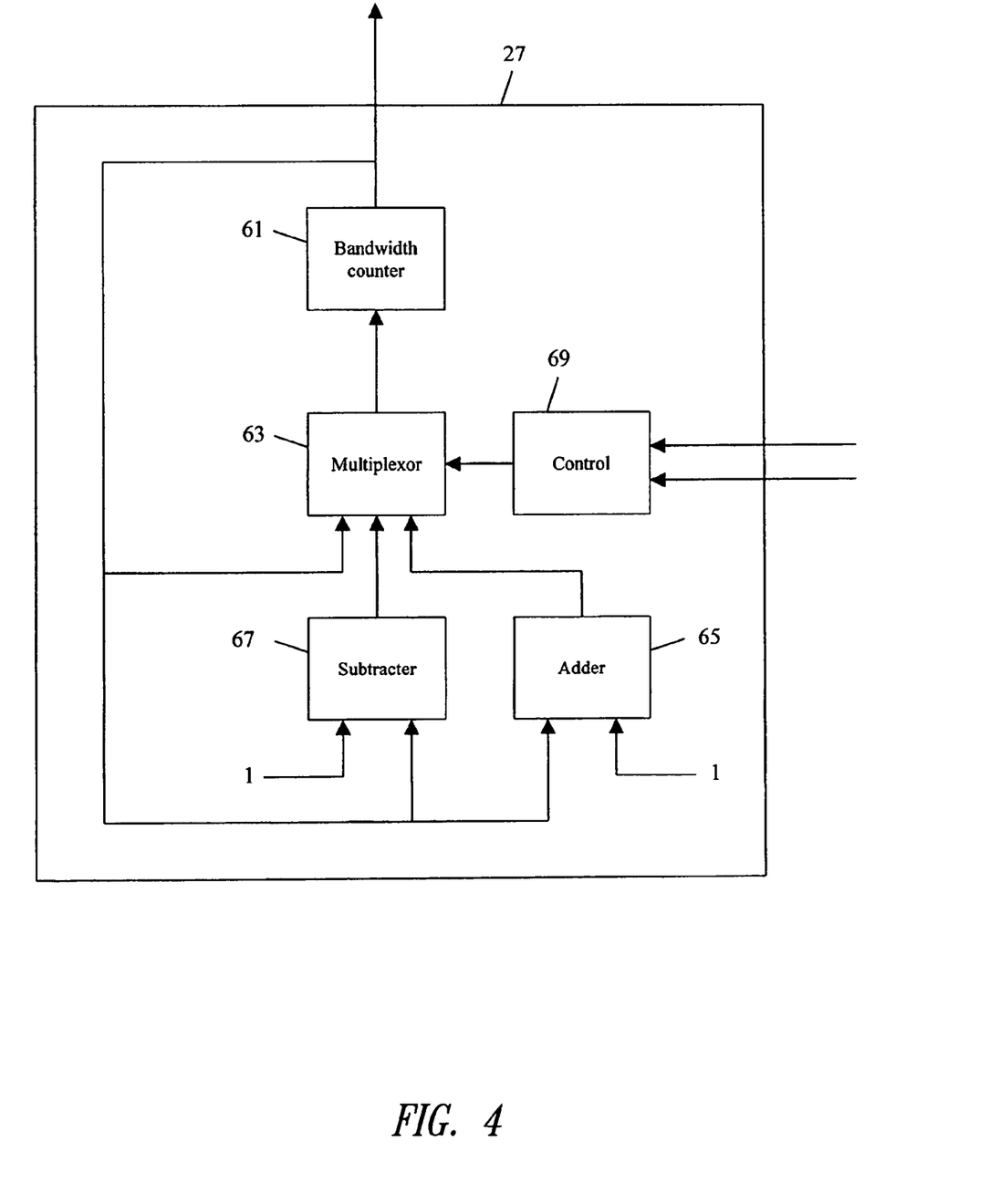
FIG. 4 is a schematic diagram of an embodiment of the bandwidth block shown in FIG. 2.

FIG. 4 shows a schematic diagram of an embodiment of the bandwidth block 27. The bandwidth block 27 comprises a bandwidth counter 61, a multiplexor 63, an adder 65, a subtracter 67, and a control 69. The contents of the bandwidth counter 61 is initially set to zero and may be subsequently modified by the output of the MUX 63.

The current value of the bandwidth counter 61 forms a first input into both the adder 65 and the subtracter 67. The second input into each of the adder 65 and subtracter 67 comprises a signal representing a value of 1. The adder 65 and subtracter 67 are respectively arranged to increment and decrement the value of the first input by an amount equal to the second input. The output of the adder 65 forms a first input of the MUX 63, and the output of the subtracter 67 forms a second input of the MUX 63. A third input of the MUX comprises the current value of the bandwidth counter 61. One of the inputs of the MUX 63 is selected and is output from the MUX 63 into the bandwidth counter 61. In this way, the value of the bandwidth counter 61 may be either incremented in value by one, decremented in value by one, or held constant depending on the selection of an input as the output. This selection is made by the output of the control 69.

The control 69 receives the data portion signals comprised in the access signal generated by the data access monitor 11 at a first input. The control 69 receives the decrement signals generated by the decrement block 29 at a second input. The control 69 is arranged to generate an output to control the MUX 63 accordingly. If a data portion signal generated by the data access monitor 11 having the value 1 is received, the control 69 outputs a signal causing the MUX 63 to select the incremented value of the bandwidth counter 61 as an output. If a decrement signal generated by the decrement block 29 having a value of 1 is received, the control 69 outputs a signal causing the MUX 63 to select the decremented value of the bandwidth counter 61 as an output. If no signals are received by the control 69, then the control outputs a signal causing the MUX 63 to select the unmodified value of the bandwidth counter 61 as an output. The current value of the bandwidth counter 61 may be accessed by the monitoring block 31.

Figure 5:
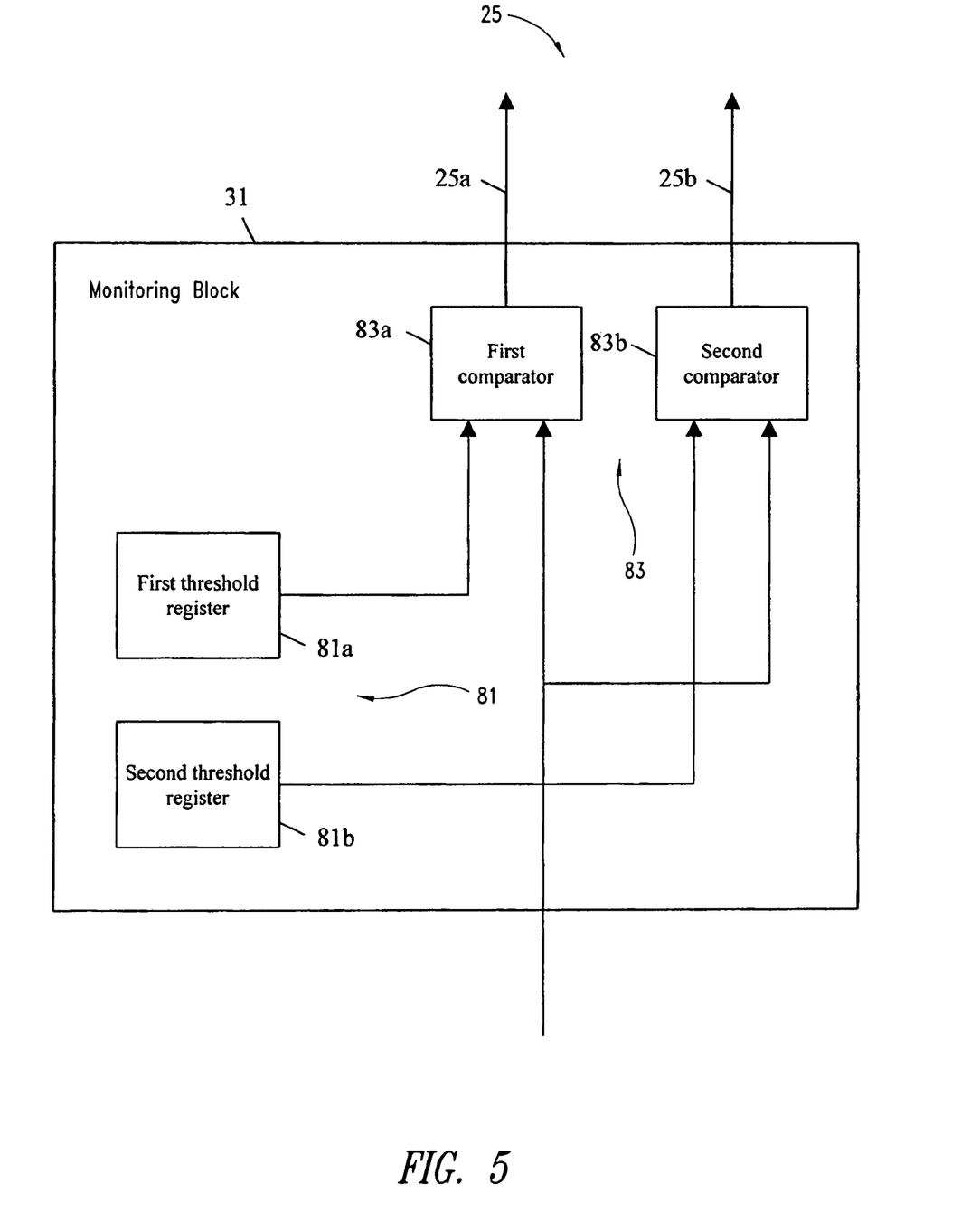
FIG. 5 is a schematic diagram of an embodiment of the monitoring block shown in FIG. 2.

FIG. 5 is a schematic diagram of an embodiment of the monitoring block 31. The monitoring block 31 is connected to the bandwidth block 27 so that the monitoring block 31 can retrieve the current value of the bandwidth counter 61. The monitoring block 31 comprises a memory 81 arranged to store one or more predetermined bandwidth counter threshold levels, and one or more comparators 83 arranged to compare the current value of the bandwidth counter to each one of the threshold values. The memory 81 may comprise for example a series of threshold registers $81a$, $81b$, each storing a single threshold value. The value of the bandwidth counter 61 forms a first input of each of the comparators $83a$, $83b$. The values of each threshold register $81a$, $81b$ respectively forms a second input of each of the comparators $83a$, $83b$. If the monitoring block 31 determines, as a result of the comparisons, that the bandwidth counter 61 has exceeded a particular threshold, then the monitoring block 31 outputs a threshold signal on one of a series of communication links 25, each corresponding to a particular threshold. For example, a threshold signal is output on a first link if a first threshold is exceeded, a threshold signal is output on a second link if a second threshold is exceeded, and so on. The threshold signal on each link comprises the output of a corresponding one of the comparators $83a$, $83b$. A signal may comprise for example a 1 bit pulse if a threshold is exceeded.

In an alternative embodiment, the monitoring block 31 may, instead of generating series of threshold signals, transmit a single threshold instruction on a communication link arranged to indicate that a particular threshold has been exceeded, and arranged to indicate which threshold has been exceeded if there is more than one. The threshold instruction may comprise for example a bitfield with each bit corresponding to a particular threshold so that a particular bit is set to a value of 1 if the corresponding threshold is exceeded and set to a value of 0 otherwise.

The threshold signals 25, may, for example, provide an indication that the time averaged rate of data access from the external memory 3 is above a particular level, and various actions may then be initiated according to the output threshold signals 25. For example, in one embodiment, if the bandwidth counter 61 exceeds a first threshold, the threshold signal output from a first link 25a may cause the system 1 to present a warning sign to a user. If the bandwidth counter 61 exceeds a second threshold, the threshold signal output from a second link 25b may cause a system reset, thereby terminating all operations. In one embodiment, if a particular threshold is exceeded then the system 1 blocks further data access until the threshold is no longer exceeded, without shutting down the system 1. For example, a data blocking device 84 controlled by a threshold signal may be located along the data pathway 9 between the external memory 3 and the data bus 5. In another embodiment, the decryption block 30 may be deactivated if a particular threshold signal is generated so that only encrypted data is retrieved when the bandwidth exceeds a particular threshold.

To increase the security of the system 1, the components in the system 1, except for the external memory 3, and in some embodiments, portions of the communication link 9, the bus 5 and the device 6, may be contained on a single monolithic device, for example a monolithic integrated semiconductor circuit 86. As shown in FIG. 1, at least part of the communication link 9 connecting the external memory 3 to the system bus 5, and the communication link 19 are contained on the monolithic device. This ensures that hackers are unable to feed illegitimate signals into the data access monitor 11 or the bandwidth comparator 13. Embodiments of the present invention may be advantageously combined with other security features such as encryption schemes.

Figure 6:
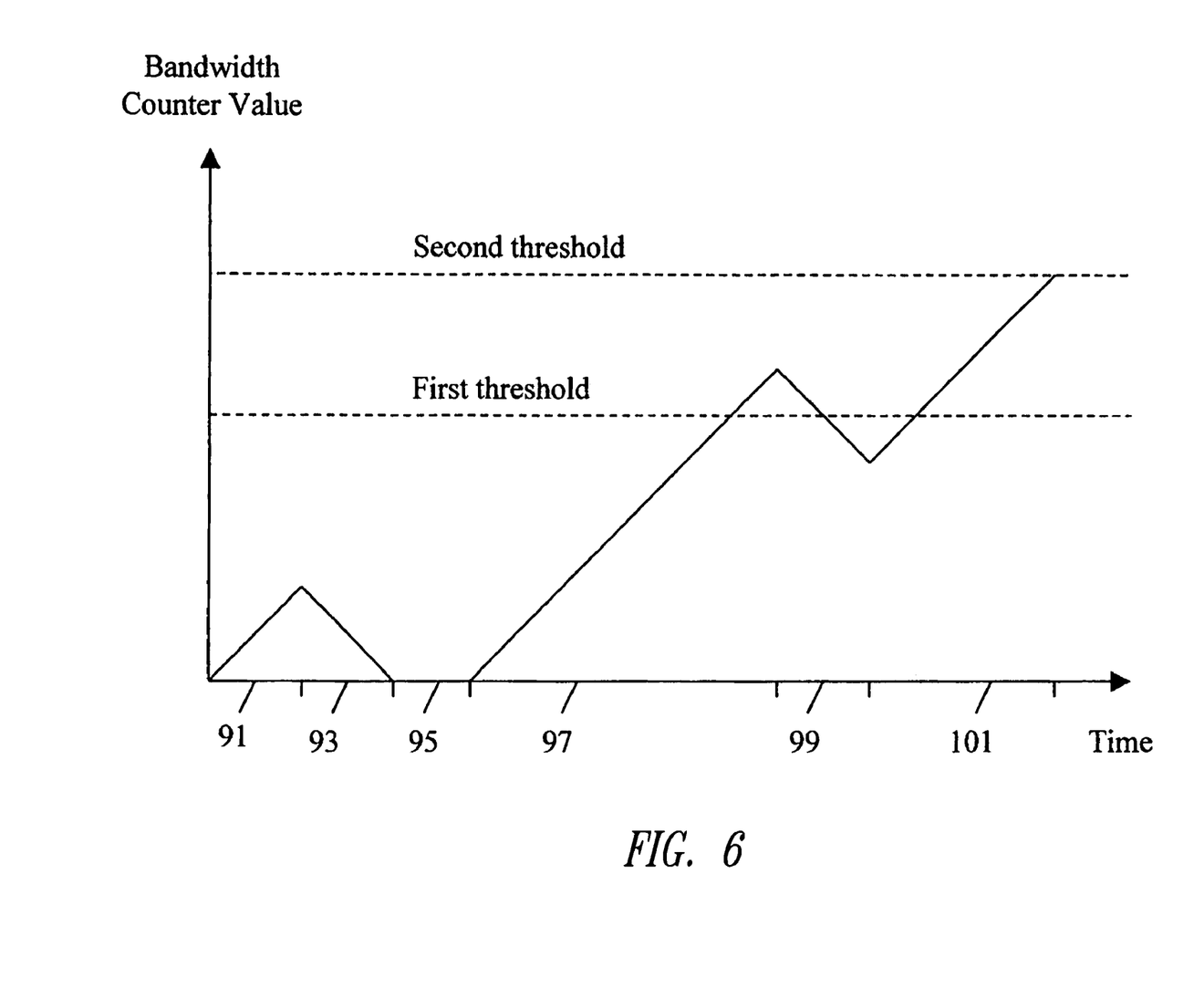
FIG. 6 is a graph of the time variation of the value of the bandwidth counter shown in FIG. 3 during usage of the system.

FIG. 6 is a graph of the time variation of the value of the bandwidth counter 61 during usage of the system 1. On initializing the system, the bandwidth counter 61 is set to a zero value. During a first time period, data access satisfying all the specified conditions is being performed from the external memory 3. The data access monitor 11 detects that data is being accessed and generates an access signal 21 comprising a flow of data portion signals which cause the bandwidth counter 61 to increment. At the same time, the decrement signals 33 generated by the decrement block 29 cause the bandwidth counter to decrement. If the frequency of the data portion signals 21 generated by the data access monitor 11 is greater than that of the decrement signals generated by the decrement block 29, the resultant effect is that the value of the bandwidth counter 61 increases. The gradient of the slope during the first time period is equal to the difference between the frequencies of the two signals. If the rate of data access is sufficiently low so that the frequency of data portion signals generated by the data access monitor 11 is lower than the frequency of decrement signals generated by the decrement block 29, then the bandwidth counter 61 will decrease in value.

During a second time period, there is no data access from the external memory 3 that satisfies all the specified conditions. This could result for example from no data being accessed at all, from only unprivileged data being accessed, or data access requested by a secure device. During the second time period, the data access monitor 11 generates an access signal which does not comprise any data portion signals. In this case the access signal may comprise a flow of bits having the value zero so that the bandwidth counter 61 is not caused to increment. The bandwidth block 27 still receives decrement signals 33 generated by the decrement block 29 however, and so the value of the bandwidth counter 61 decreases. The gradient of the slope during the second time period is equal to minus the frequency of decrement signals 33 generated by the decrement block 29. When the bandwidth counter 61 reaches zero, it can no longer decrease any further, and during a third time period, the bandwidth counter maintains a zero value. Preventing the bandwidth counter 61 from falling below zero prevents unauthorized access of large volumes of data which could otherwise occur by waiting until the bandwidth counter 61 has fallen to a large negative value.

During a fourth time period, data access is once again occurring that satisfies the specified conditions, and the value of the bandwidth counter 61 increases in the same way as during the first time period. If data is accessed at a faster rate, then the rate of increase of the bandwidth counter 61 will increase accordingly. During the fourth time period, the value of the bandwidth counter 61 increases to such an extent that it eventually exceeds a first threshold. When the first threshold is exceeded, the monitoring block 31 outputs a threshold signal on a first link 25a which causes a warning to be displayed or otherwise conveyed to a user. The warning is intended to indicate to the user that the rate of data access exceeds the authorized level, and that a system reset will be performed if the current rate of data access is maintained.

At the beginning of a fifth time period, data access satisfying the specified conditions is terminated, and during this period, the value of the bandwidth counter 61 decreases. When the bandwidth counter 61 value decreases sufficiently so that it falls below the first threshold value, the monitoring block 31 no longer generates a threshold signal and the warning is terminated.

During a sixth time period, data access satisfying the specified conditions once again resumes, and the value of the bandwidth counter 61 increases until the first threshold is exceeded and a warning is initiated. Data access continues at a rate which is higher than the authorized time averaged rate until, eventually, the bandwidth counter 61 reaches and exceeds a second threshold value. At this point, the monitoring block 31 outputs a threshold signal on a second link 25b which causes a system reset, thereby preventing further access of data.

It can be seen that the allowable time averaged rate of data access is determined by the decrement counter rate. A higher decrement counter rate allows for a greater rate of data retrieval. However, it is possible to access data from the external memory 3 for a short time at a rate that exceeds the allowable time averaged rate, but this causes the value of the bandwidth counter 61 to increase. The level of the bandwidth counter 61 thus provides a measure of the extent to which the allowed time averaged rate has been exceeded.

The value of the threshold determines the extent to which the time averaged rate of data access may be legitimately exceeded before steps are taken to prevent further access. If data is retrieved at a rate that exceeds the allowable time averaged rate for a period of time, to avoid exceeding the bandwidth counter value threshold, data must be retrieved for a period of time at a rate which is lower than the allowable time averaged rate. This ensures that overall, the time averaged rate of retrieval is restricted to below the threshold.

The allowable bandwidth may be controlled, by modifying parameters including the first and second threshold values, the rate of generation of decrement signals, and the volume of data corresponding to each access signal. In general, for any period at the beginning of which the decrement counter is equal to zero, and during which the decrement counter remains above zero, the value of these parameters determines the maximum volume of data that can be retrieved during that period without the threshold being exceeded. The distribution of how data is retrieved over the time period is arbitrary so long as the total volume retrieved does not exceed a particular level. This maximum volume divided by the duration of the time period is the time-averaged authorized bandwidth. For example, having large threshold values but a low decrement clock rate allows a large volume of data to be retrieved in a short period of time (at a high bandwidth), but then a long time must pass before the bandwidth counter 61 returns to a low level allowing further significant volumes of data to be retrieved. This provides for bursty data retrieval. Alternatively, with the same parameter values, data may be continuously retrieved at a rate equal to the allowable long term rate providing for more steady data retrieval.

In one embodiment, the parameters which affect the allowable bandwidth may be modified by a secure device such as an internal processor 88 running code stored on read only memory (ROM). The parameters may also be modified for example according to the identity of the device (e.g., device 6) which is requesting data. In one case, a high bandwidth may be set for a device which is secure and which usually requires access to large volumes of data. In another case, the bandwidth may be set to a lower value if the device requesting the data is less secure, or is a device which should not require access to significant volumes of data.

In one embodiment, a condition is specified so that if a particular device requests access to privileged data, then the data access is monitored. Any other data access is not monitored. For example, it is required to let insecure devices such as processors access secure memory spaces for many reasons including debugging, and small modifications or analysis of data. However, insecure devices may not be allowed to read the entire memory space out. In this case, if the bandwidth monitor determines that, for example a processor is attempting to read privileged data from the external memory, then the bandwidth of that data access is restricted to below authorized levels.

Although the embodiments described above data access has generally referred to data retrieval from the external memory 3, the invention is equally applicable to data which is written to the external memory 3. In this case, the rate at which data may be written to the external memory 3 may be restricted depending on, for example, the identification of the device which is writing the data, and on the location of memory the data is being written to.

The term "computer-readable medium" as used herein refers to any medium that participates in providing instructions to a processor for execution. Such a medium may take many forms, including but not limited to, non-volatile media, volatile media, and transmission media. Non-volatile media includes, for example, hard, optical or magnetic disks. Volatile media includes dynamic memory. Transmission media includes coaxial cables, copper wire and fiber optics. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to a processor for execution. For example, the instructions may initially be carried on a magnetic disk of a remote computer. The remote computer can load the instructions into its dynamic memory and send the instructions over a telephone line using a modem. A modem local to computer system can receive the data on the telephone line and use an infrared transmitter to convert the data to an infrared signal. An infrared detector coupled to a system bus can receive the data carried in the infrared signal and place the data on system bus. The system bus carries the data to system memory, from which a processor retrieves and executes the instructions. The instructions received by system memory may optionally be stored on storage device either before or after execution by the processor.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A semiconductor integrated circuit for restricting a rate of data access from an external memory requested by one of one or more devices coupled to the semiconductor integrated circuit, comprising:
   one or more processing devices configured to implement:
   a data access monitor configured to determine whether a data access request is from an insecure device seeking to access a portion of the external memory storing privileged data, the external memory divided into portions storing privileged data and unprivileged data, and to generate an access signal indicating whether an insecure device is requesting access to a portion of the external memory storing privileged data: and
   a bandwidth comparator configured to receive the access signal, and, if the access signal indicates that the insecure device is requesting access to a portion of the external memory storing privileged data, to determine a rate of data retrieval for the data access request, compare the rate of data retrieval with one or more thresholds, and to selectively limit the rate of data retrieval for the data access request to a selected rate based on the comparison.

2. A semiconductor integrated circuit according to claim 1 wherein the data access monitor comprises:
   a first memory configured to store an indication of which devices are insecure; and
   a first comparator configured to compare an identification of a device which requested the data access with the indications of which devices are insecure, and configured to generate a first condition signal to indicate whether the device requesting data is insecure.

3. A semiconductor integrated circuit according to claim 1 wherein the data access monitor further comprises:
   a second memory configured to store an indication of which portions of the external memory contain privileged data; and
   a second comparator configured to compare a location of a portion of retrieved data with those locations which contain privileged data, and configured to generate a second condition signal to indicate whether the retrieved data portion is privileged.

4. A semiconductor integrated circuit according to claim 3 wherein the second memory is configured to store start and end memory addresses of each portion of the external memory, and an indication of whether each portion stores privileged or unprivileged data.

5. A semiconductor integrated circuit according to claim 1 wherein the access signal comprises a stream of data portion signals, each data portion signal corresponding to a portion of data of a size being retrieved from the external memory.

6. A semiconductor integrated circuit according to claim 5 wherein each data portion signal comprises a one bit signal.

7. A semiconductor integrated circuit according to claim 5 wherein the bandwidth comparator is configured to determine the rate of data retrieval by determining a frequency at which data portion signals are received.

8. A semiconductor integrated circuit according to claim 7 wherein the bandwidth comparator comprises:
a decrement block comprising a timer, the decrement block being configured to periodically output a decrement signal at selected time intervals;
a bandwidth block having a first input that receives data portion signals from the data access monitor, and a second input that receives decrement signals from the decrement block, and comprising a bandwidth counter configured to increment in value when a signal is received at the first input, and configured to decrement when a signal is received at the second input; and
a monitoring block configured to receive a current value of the bandwidth counter, to compare the value of the bandwidth counter with one or more thresholds, and to output a threshold signal according to whether one of the thresholds has been exceeded.

9. A semiconductor integrated circuit according to claim 1 wherein the bandwidth comparator is configured to compare the rate of data retrieval with a first threshold and to cap data retrieval if the first threshold has been exceeded.

10. A semiconductor integrated circuit according to claim 9 wherein the bandwidth comparator is configured to compare the rate of data retrieval with a second threshold which is lower than the first threshold, and to cause a warning to be conveyed to a user if the second threshold has been exceeded.

11. A semiconductor integrated circuit according to claim 9 wherein the first threshold is a value corresponding to a data retrieval rate of 200 kbits/second.

12. A semiconductor integrated circuit according to claim 1 wherein the bandwidth monitor is configured to restrict the rate of data retrieval from the external memory if the device requesting the data is a processor.

13. A conditional access device for pay television, comprising:
a semiconductor integrated circuit for restricting a rate of data access from an external memory requested by one of one or more devices coupled to the semiconductor integrated circuit, the external memory including portions storing privileged data and portions storing unprivileged data, the semiconductor integrated circuit including one or more processing devices configured to implement:
a data access monitor configured to determine whether a data access from the external memory satisfies one or more conditions, the conditions including the data access being an insecure device accessing a portion of the external memory storing privileged data, and to generate an access signal according to whether the conditions are satisfied; and
a bandwidth comparator configured to receive the access signal, and, if the access signal indicates that the data access satisfies the conditions, to determine a rate of data retrieval that satisfies the conditions, compare the rate of data retrieval with one or more thresholds, and to selectively limit the rate of data retrieval for the data access request to a selected rate based on the comparison.

14. The conditional access device of claim 13 wherein the data access monitor comprises:
a first memory configured to store an indication of which devices are secure; and
a first comparator configured to compare an identification of a device which requested the data access with the indications of which devices are secure, and to generate a first condition signal to indicate whether the device requesting data is secure.

15. A method comprising:
restricting the rate of data access requested by one of one or more devices from an external memory having portions storing privileged data and portions storing unprivileged data by:
monitoring data accesses from the external memory;
determining whether a monitored data access is from an insecure device accessing a portion of the external memory storing privileged data; and
when the monitored data access is from an insecure device accessing a portion of the external memory storing privileged data:
determining a rate of data access satisfying conditions;
comparing the rate of data access with one or more thresholds;
generating a threshold signal according to whether one or more of the thresholds have been exceeded; and
limiting the rate of the data access to a selected rate if one or more of the thresholds are exceeded.

16. The method according to claim 15 wherein determining whether a monitored data access is from an insecure device accessing a portion of the external memory storing privileged data comprises the steps of:
receiving an identification of the device requesting the data; and
comparing the device identification with one or more identifiers.

17. The method according to claim 16 wherein determining whether a monitored data access is from an insecure device accessing a portion of the external memory storing privileged data further comprises the steps of:
receiving an identification of a location of data being retrieved from the external memory; and
comparing the identified location with one or more memory locations.

18. The method according to claim 15, further comprising generating an access signal including a stream of data portion signals, each data portion signal corresponding to a portion of data of a selected size being retrieved from the external memory.

19. The method according to claim 18 wherein each data portion signal comprises a one bit signal.

20. The method according to claim 18 wherein determining the rate of data access comprises determining the frequency at which data portion signals are received.

21. The method according to claim 18 wherein determining the rate of data access comprises:

causing a counter to be incremented when a data portion signal is received; and causing the counter to be decremented at a constant rate, wherein the counter value is indicative of the rate of data access.

22. The method according to claim 21, further comprising:
determining that the counter value exceeds a first threshold; and
causing a system reset if the first threshold is exceeded.

23. The method according to claim 22, further comprising the steps of:
determining that the counter value exceeds a second threshold wherein the second threshold is lower than the first threshold; and
presenting a warning to a user if the second threshold is exceeded.

24. The method according to claim 22 wherein the first threshold is a value corresponding to a data retrieval rate of 200 kbits/second.

25. A system for controlling access to a memory having portions storing privileged data and portions storing unprivileged data, the system comprising:
means for determining whether a received data request is from a secure device;
means for determining whether the received data request is directed to privileged data stored in the memory;
means for determining whether a rate of data exceeds a first threshold; and
means for restricting access to the memory communicatively coupled to the means for determining whether a received data request is from a secure device and the means for determining whether a rate of data exceeds a first threshold and configured to selectively limit a rate of data access to a selected rate when the received data request is not from a secure device and the request is directed to privileged data stored in the memory, based on whether the rate of data exceeds the first threshold.

26. The system of claim 25, further comprising means for preventing receipt of illegitimate signals by the means for determining whether a received data request is from a secure device, the means for determining whether the received data request is directed to privileged data stored in the memory, and the means for determining whether a rate of data exceeds a first threshold and the means for restricting access to the memory.

27. The system of claim 26 wherein the means for preventing receipt of illegitimate signals comprises a monolithic integrated semiconductor circuit.

28. The system of claim 25, wherein the means for determining whether a received data request is from a secure device, the means for determining whether the received data request is directed to privileged data stored in the memory, the means for determining whether a rate of data exceeds a first threshold and the means for restricting access to the memory are integrated into a monolithic semiconductor.

29. The system of claim 25 wherein the means for determining whether a received data request is from a secure device comprises a data access monitor.

30. The system of claim 29 wherein the data access monitor comprises a first memory, a first comparator and a signal generator.

31. The system of claim 25 wherein the means for determining whether a rate of data exceeds a first threshold comprises a bandwidth comparator.

32. The system of claim 25 wherein the means for restricting access to the memory comprises a data blocking device.

33. The system of claim 25, further comprising means for decrypting encoded data.

34. A method, comprising:
controlling access to a memory having portions storing privileged data and portions storing unprivileged data by:
receiving a request from an insecure device to access privileged data stored in the memory;
selectively processing the request;
monitoring a data rate associated with the processing;
comparing the rate of data access with one or more thresholds; and
selectively limiting the data access to a selected rate based on the comparison.

35. The method of claim 34 wherein selectively processing the request comprises:
determining whether the request is from an authorized device; and
processing the request when the request is from an authorized device.

36. At least one non-transitory computer readable memory storage medium containing instructions for causing a memory controller to:
determine whether a received request to access a memory storing privileged and unprivileged data is from an insecure device seeking access to a portion of the memory storing privileged data;
when the request is from an insecure device seeking access to a portion of the memory storing privileged data, process the request by:
monitoring a data rate associated with the processing;
comparing the rate of data access with one or more thresholds; and
selectively limiting the rate of the data access to a selected rate based on the comparison.

37. The at least one non-transitory computer readable memory storage medium of claim 36 wherein the instructions cause the memory controller to determine a type of an authorized device and to control access to the memory based on the determined type.

* * * * *